United States Patent
Byun et al.

(10) Patent No.: US 8,216,707 B2
(45) Date of Patent: Jul. 10, 2012

(54) RECHARGEABLE BATTERY

(75) Inventors: Sang-Won Byun, Suwon-si (KR);
Yong-Sam Kim, Suwon-si (KR);
Masanori Kogure, Suwon-si (KR);
Kyung-Joon Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 695 days.

(21) Appl. No.: 12/365,049

(22) Filed: Feb. 3, 2009

(65) Prior Publication Data
US 2010/0028724 A1 Feb. 4, 2010

(30) Foreign Application Priority Data
Aug. 4, 2008 (KR) .................. 10-2008-0076092

(51) Int. Cl.
*H01M 2/02* (2006.01)
(52) U.S. Cl. .................. 429/10; 429/7; 429/61
(58) Field of Classification Search .............. 429/10
See application file for complete search history.

(56) References Cited

U.S. PATENT DOCUMENTS

| 3,002,042 A | * | 9/1961 | Rowe | 429/61 |
| 5,111,128 A | * | 5/1992 | Branan et al. | 320/106 |
| 5,728,482 A | * | 3/1998 | Kawakami et al. | 429/10 |

FOREIGN PATENT DOCUMENTS

| JP | 2002-358943 | 12/2002 |
| KR | 10-2007-0067782 | 6/2007 |

* cited by examiner

*Primary Examiner* — John S Maples
(74) *Attorney, Agent, or Firm* — Christie, Parker & Hale, LLP

(57) ABSTRACT

A rechargeable battery includes an electrode array for generating current, a case for containing the electrode array and a cap electrically connected to the electrode array through the case. The rechargeable battery also includes a current interruption device having a connection to electrically connect the electrode array and the cap assembly and a magnet proximate the connection of the current interruption device for forming a magnetic field at the connection.

12 Claims, 5 Drawing Sheets

RECHARGEABLE BATTERY

CROSS-REFERENCE TO RELATED APPLICATION

This application claims priority to and the benefit of Korean Patent Application No. 10-2008-0076092 filed in the Korean Intellectual Property Office on Aug. 4, 2008, the entire content of which is incorporated herein by reference.

BACKGROUND OF THE INVENTION

1. Field of the Invention

The present invention relates to a rechargeable battery.

2. Description of the Related Art

A rechargeable battery may include an electrode array having an anode, a separator, and a cathode sequentially arranged and wound, a case containing the electrode array, and a cap assembly for sealing an open side of the case.

In a cylindrical rechargeable battery, for example, an anode and a cathode of the electrode array include sections that are not coated with active material and an anode uncoated part and a cathode uncoated part may face opposite directions.

A cathode current collector plate is attached to the cathode uncoated section, and an anode current collector plate is attached to the anode uncoated section. The cathode current collector plate may be connected to the case, and the anode current collector plate may be connected to the cap assembly. The cathode current collector plate and the anode current collector plate lead the current to the exterior.

In such a configuration, the case operates as a cathode terminal and the cap assembly operates as an anode terminal. The cap assembly and the case are connected with a gasket interposed therebetween.

The rechargeable battery may include a current interruption device (CID) for preventing thermal runaway by interrupting current flow at a threshold internal pressure of a battery. The CID may include a vent plate connected to a sub-plate in the cap plate to interrupt current flow to the cap assembly in the electrode array.

However, an arc may be generated when the vent plate is separated from the sub-plate by operation of the CID. If the arc is sustained by the operation of the CID, the vent plate, the sub-plate, and the peripheral area thereof may melt, thereby generating a junction.

In case of overcharge, the arc generated by the operation of the CID may progress to thermal runaway. As such, the rechargeable battery may catch fire or explode. Accordingly, it is desirable to eliminate the arc generated at an early stage, that is, before the peripheral area melts.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a rechargeable battery capable of preventing or reducing arc generation during operation of a current interruption device, and particularly for eliminating arc generation at an early stage of current interruption. Additionally, embodiments of the present invention provide a rechargeable battery for preventing or reducing arc generation when a vent plate is separated from a sub-plate by an abnormal internal reaction.

A rechargeable battery includes an electrode array for generating current, a case for containing the electrode array and a cap electrically connected to the electrode array through the case. The rechargeable battery also includes a current interruption device having a connection to electrically connect the electrode array and the cap assembly and a magnet proximate the connection of the current interruption device for forming a magnetic field at the connection.

In one embodiment, the case is cylindrical and the magnet is symmetrical about a center line that extends along the length of the cylindrical case. Further, the magnet may have a circular shape or a disk shape and may be on the same horizontal plane as the connection, which may be located in a central area of the magnet.

The magnet may be within the case, and more specifically, within the cap assembly, or the magnet may be outside of the case, such as on the cap assembly or encircling the cap assembly. The magnet may also extend along a horizontal plane that is generally parallel to a horizontal plate of the connection.

In another embodiment, a rechargeable battery is provided comprising an electrode array for generating current, a case for containing the electrode array and a cap assembly electrically connected to the electrode array through the case. The cap assembly comprises a cap plate, a vent plate on one side of the cap plate, an insulating plate on one side of the vent plate, and a sub-plate connected to the vent plate and the electrode array such that the insulating plate is between the sub-plate and the vent plate. A magnet is proximate a connection between the vent plate and the sub-plate for forming a magnetic field at the connection.

In one embodiment, the cap assembly further comprises a middle plate between the insulating plate and the sub-plate and wherein the sub-plate is connected to the electrode array through the middle plate. Further, the magnet may be at a periphery of the insulating plate or the middle plate when the connection is in the center of the insulating plate or the middle plate or the magnet may be between the insulating plate and the middle plate.

DETAILED DESCRIPTION

Figure 1:
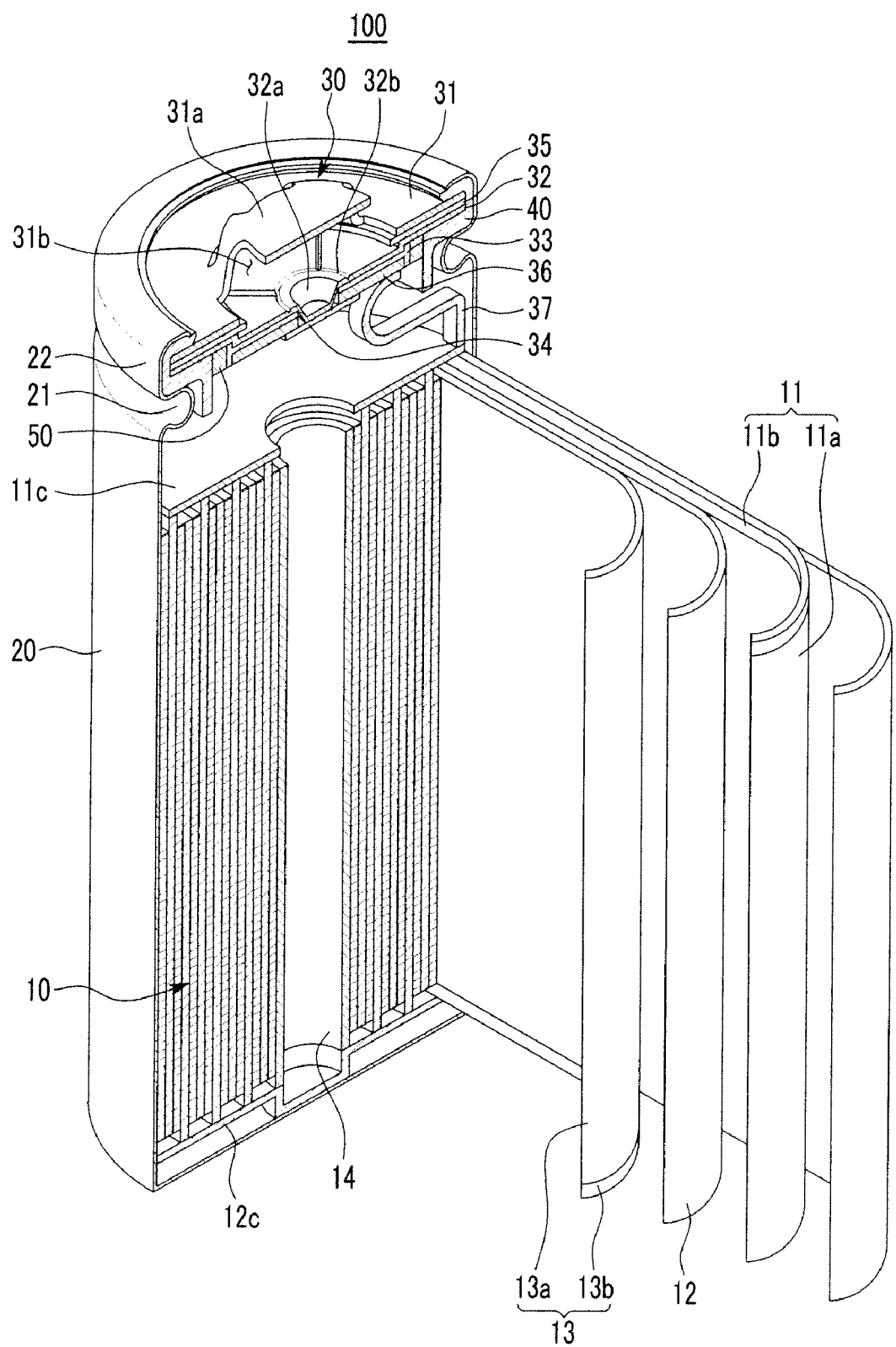
FIG. 1 is a cross-sectional partially-exploded perspective view of a rechargeable battery according to a first embodiment of the present invention.

Hereinafter, the present invention will be described more fully with reference to the accompanying drawings, in which embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Referring to FIG. 1, the rechargeable battery 100 according to the first embodiment includes an electrode array 10 for generating current, a case 20 for containing the electrode array 10, and a cap assembly 30 electrically connected to the electrode array 10 through the case 20.

The electrode array 10 includes an anode 11, a separator 12, and a cathode 13 sequentially layered and spiral-wound such that an insulator, the separator, is between the anode 11 and the cathode 13. In one embodiment, the electrode array 10 has a cylindrical shape. A sector pin 14 is disposed at the center of the cylindrical electrode array 10 and serves to maintain the cylindrical shape of the electrode array 10.

The anode 11 and the cathode 13 include coated sections 11a, 13a and uncoated sections 11b, 13b. The coated sections 11a, 13a are coated with an active material, and may be thin metal foils that form a current collector. The uncoated sections 11b, 13b are absent the active material. An anode current collector plate 11c is connected to the uncoated part 11b of the anode 11, and a cathode current collector plate 12c is connected to the uncoated part 12b of the cathode 12.

The case 20 may have a cylindrical shape or a square shape with one side open to allow for insertion of the electrode array 10. The case 20 may be connected to the cathode current collector plate 12c to operate as a cathode terminal of the rechargeable battery 100. The case may comprise a conductive metal, for example aluminum, an aluminum alloy, or nickel-plated steel.

The cap assembly 30 is connected to the open side of the case 20 with a gasket 40 interposed between the cap assembly and the case, thereby sealing the case 20 and the electrode array 10 and an electrolyte therein. Also, the cap assembly 30 includes a current interruption device (CID) and is electrically connected to the electrode array 10 through a connection 45 of the CID (FIG. 3).

According to the first embodiment of the present invention, the rechargeable battery 100 further includes a magnet 50 disposed around the connection 45 in order to form a magnetic field at the connection 45 of the CID that may prevent or reduce arc generation at the connection 45 during operation of the CID. Specifically, the magnet 50 may eliminate an arc generated at an early stage of operation of the CID.

The connection 45 may include various structures. Also, the magnet 50 forming the magnetic field around the connection 45 may be disposed at various locations in the rechargeable battery 100. Hereinafter, magnets 50 formed in various shapes and disposed at various locations corresponding to the connection 45 will be described.

Figure 2:
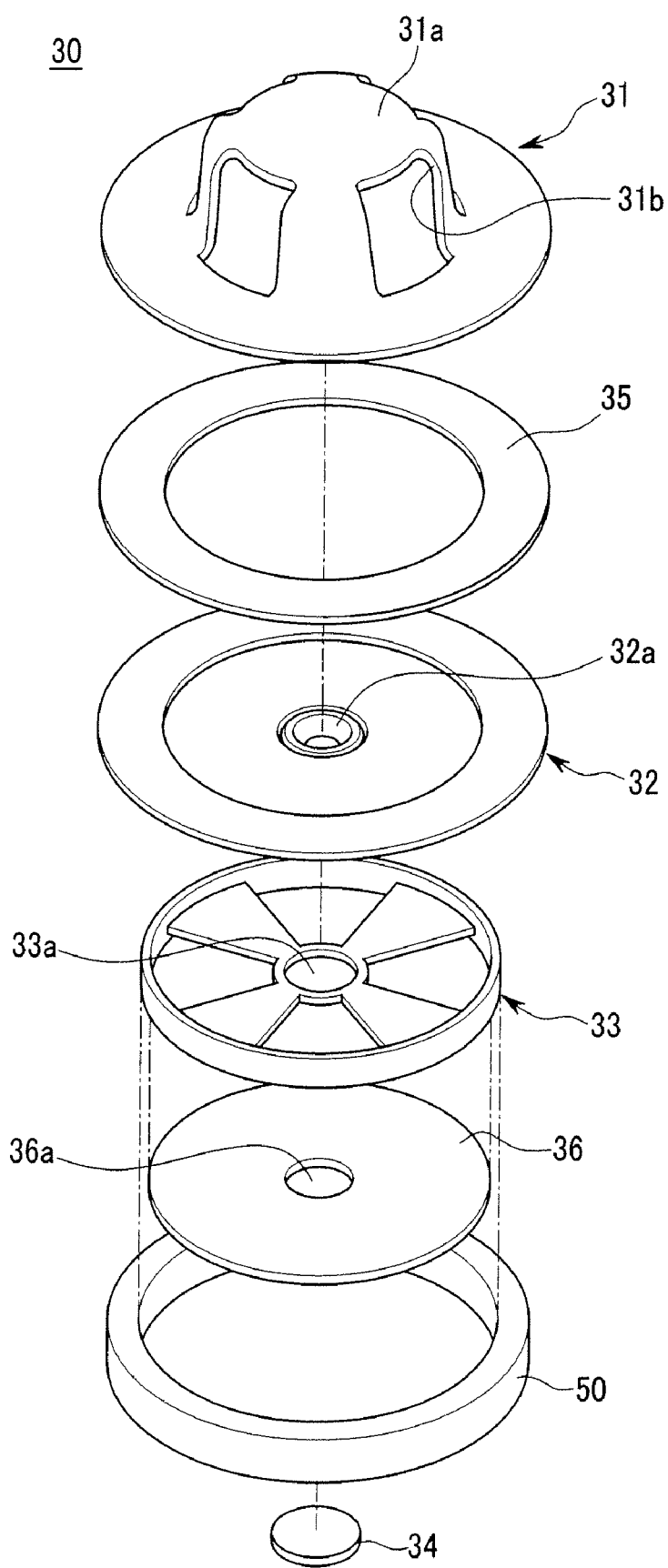
FIG. 2 is an exploded view of a cap assembly of FIG. 1.
Figure 3:
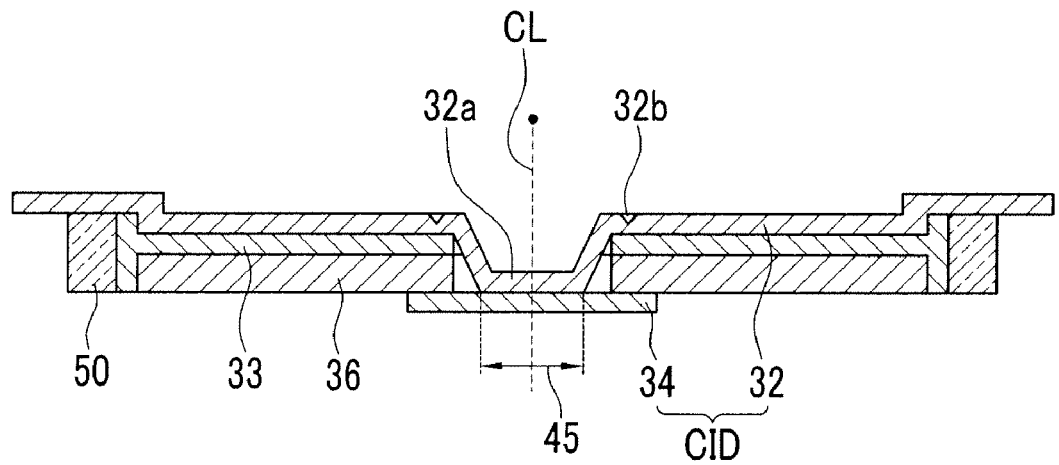
FIG. 3 is a cross-sectional view of a cap assembly of FIG. 1.

FIG. 2 is an exploded perspective view of a cap assembly of FIG. 1, and FIG. 3 is a cross-sectional view of the cap assembly of FIG. 1.

Referring to FIG. 2 and FIG. 3, the cap assembly 30 includes a cap plate 31, a vent plate 32, an insulation plate 33, a sub-plate 34, a positive temperature coefficient element 35, a middle plate 36, and a magnet 50.

Substantially, the CID is formed of the vent plate 32 and the sub-plate 34, and the connection 45 of the CID is formed by a welded portion of the vent plate 32 and the sub-plate 34.

The cap plate 31 is connected to the anode current collector plate 11c, and operates as an anode terminal of the rechargeable battery 100. The cap plate 31 includes an externally protruding terminal 31a and an exhaust pipe 31b.

The vent plate 32 formed at one end of the CID is disposed on the interior of the cap plate 31, thereby being electrically connectable to the sub-plate 34 that forms the other end of the CID.

Also, the vent plate 32 includes a vent 32a that can be fractured at a threshold pressure to allow the discharge of internal gas of the rechargeable battery 100 and interrupt electric connection to the sub-plate 34.

When the CID operates, that is, when the connection 45 of the vent plate 32 and the sub-plate 34 is separated, the electrode array 10 is electrically disconnected from the cap plate 31.

In one embodiment, the vent 32a protrudes from the vent plate 32 toward an interior of the case 20. The vent plate 32 includes a notch 32b (FIG. 3) around the vent 32a for guiding fracture of the vent 32a (see FIG. 1 and FIG. 3). The notch 32b prevents explosion of the rechargeable battery 100 by fracturing and discharging gas if pressure generated in the case 20 reaches a threshold level.

The positive temperature coefficient element 35 is disposed between the cap plate 31 and the vent plate 32 and controls current flow between the cap plate 31 and the vent plate 32. The positive temperature coefficient element 35 has electrical resistance that infinitely increases when it exceeds a threshold temperature, therefore, allowing it to interrupt charge or discharge current flow.

The sub-plate 34 faces the vent plate 32 with the insulating plate 33 interposed therebetween, and is electrically connected to the vent 32a. The middle plate 36 is disposed between the insulating plate 33 and the sub-plate 34. Since the insulating plate 33 and the middle plate 36 include penetration holes 33a, 36a, respectively, the vent 32a protruding through the penetration holes 33a, 36a is connectable to the sub-plate 34.

Therefore, the middle plate 36 includes one side electrically connected to the vent plate 32 through the sub-plate 34 and the vent 32a, and another side connected to the anode current collector plate 11c through a connector 37 (FIG. 1). The anode current collector plate 11c is electrically connected to the cap plate 31 through the connector 37, the middle plate 36, the sub-plate 34, the vent 32a, and the vent plate 32.

The cap assembly 30 is inserted into the case 20 and may be fixed to the case 20 by clamping. In one embodiment, a beading unit 21 and a clamping unit 22 are formed to fix the cap assembly 30 to the case 20.

The magnet 50 is disposed around the connection 45 of the CID. The magnet 50 forms a magnetic field at the connection 45 and a peripheral area thereof.

Referring to FIG. 3 again, the magnet 50 may be symmetrical about a center line (CL) that extends from a cylindrical center of the case in a length or axial direction. The magnet 50 may have, for example, a circular shape or a disk shape.

The circular or disk magnet 50 forms a symmetrical magnetic field about the center line (CL) at an equal distance from the connection. Therefore, it is possible to balance the prevention of arc generation and the elimination of a generated arc when the connection 45 of the CID is separated.

Also, the magnet 50 may be disposed on relatively the same horizontal plane as the connection 45. Therefore, a magnetic field formed at the magnet 50 forms a magnetic field on the same horizontal plane as the connection 45. In this case, the magnet 50 is formed in a circular shape with the connection 45 as a center and within the case 20.

In more detail, the magnet 50 according to the first embodiment is symmetrically disposed at the periphery of the insulating plate 33 and the middle plate 36 in order to form a magnetic field at the connection 45 that connects the vent plate 32 and the sub-plate 43 through, for example, welding.

Figure 4:
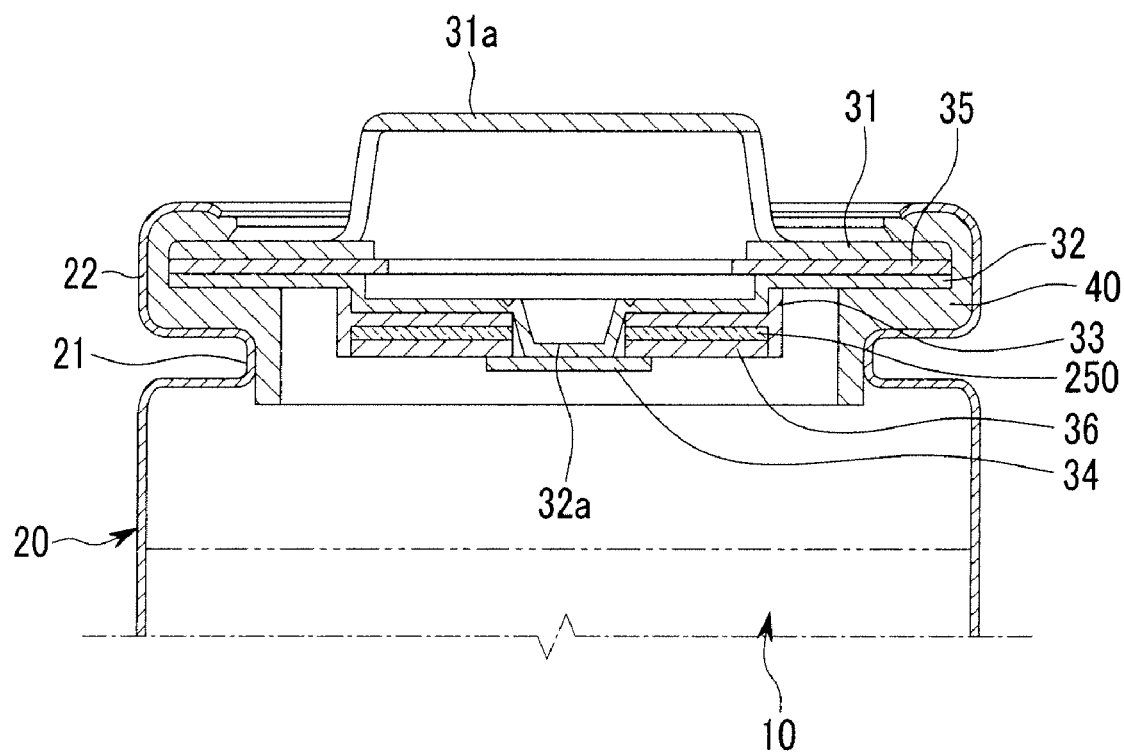
FIG. 4 is a partial cross-sectional view of a rechargeable battery according to a second embodiment of the present invention.

FIG. 4 is a partial cross-sectional view of a rechargeable battery according to the second embodiment of the present invention.

Referring to FIG. 4, a magnet 250 according to the second embodiment is disposed in the cap assembly 30. In more detail, the magnetic 250 is disposed between the insulating plate 33 and the middle plate 36.

Since the magnet 250 according to the second embodiment is disposed close to the connection 45, it is possible to effectively form a magnetic field at the connection 45.

Figure 5:
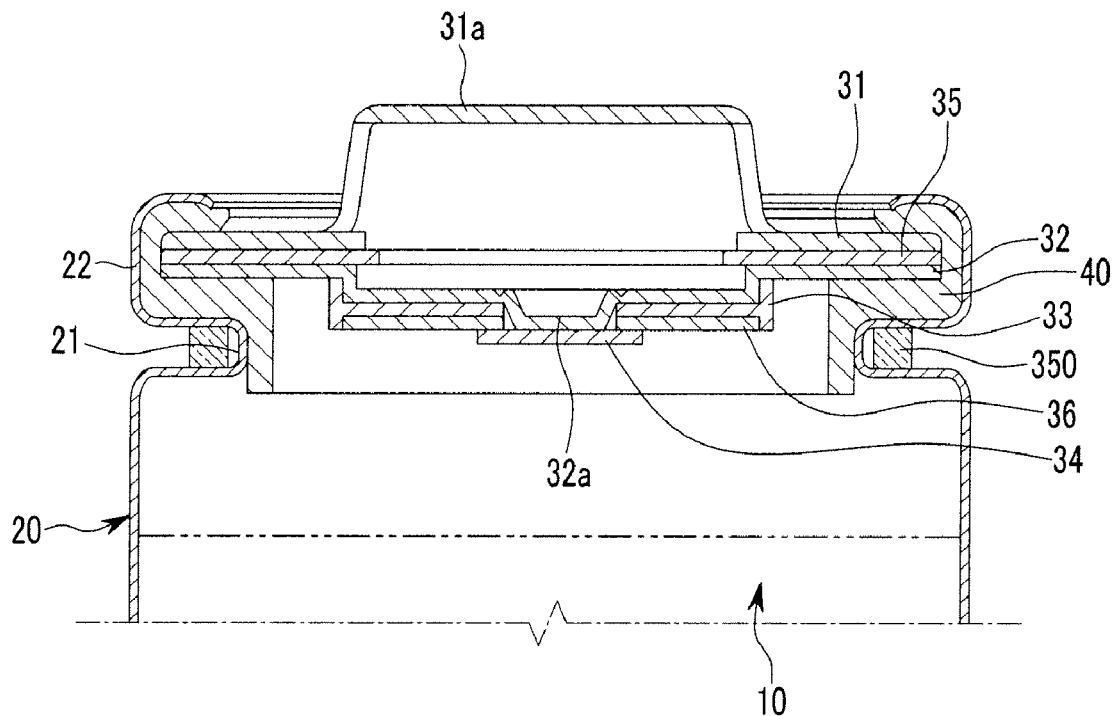
FIG. 5 is a partial cross-sectional view of a rechargeable battery according to a third embodiment of the present invention.

FIG. 5 is a partial cross-sectional view of a rechargeable battery according to the third embodiment of the present invention.

Referring to FIG. 5, a magnet 350 according to the third embodiment is disposed on an exterior of the case 20. In more detail, the magnet 350 is disposed in a circular shape around the beading unit 21 of the case 20.

Since the magnet 350 according to the third embodiment is disposed at about generally the same horizontal plane of the connection 45, it is possible to effectively form the magnetic field at the connection 45. However, since a distance between the magnet 350 of the third embodiment and the connection 45 is greater than a distance between the magnet 50 of the first embodiment and the connection 45, the magnetic field generated by the magnet 350 may not be as strong at the connection 45 as the magnetic field generated by the magnet 350.

Figure 6:
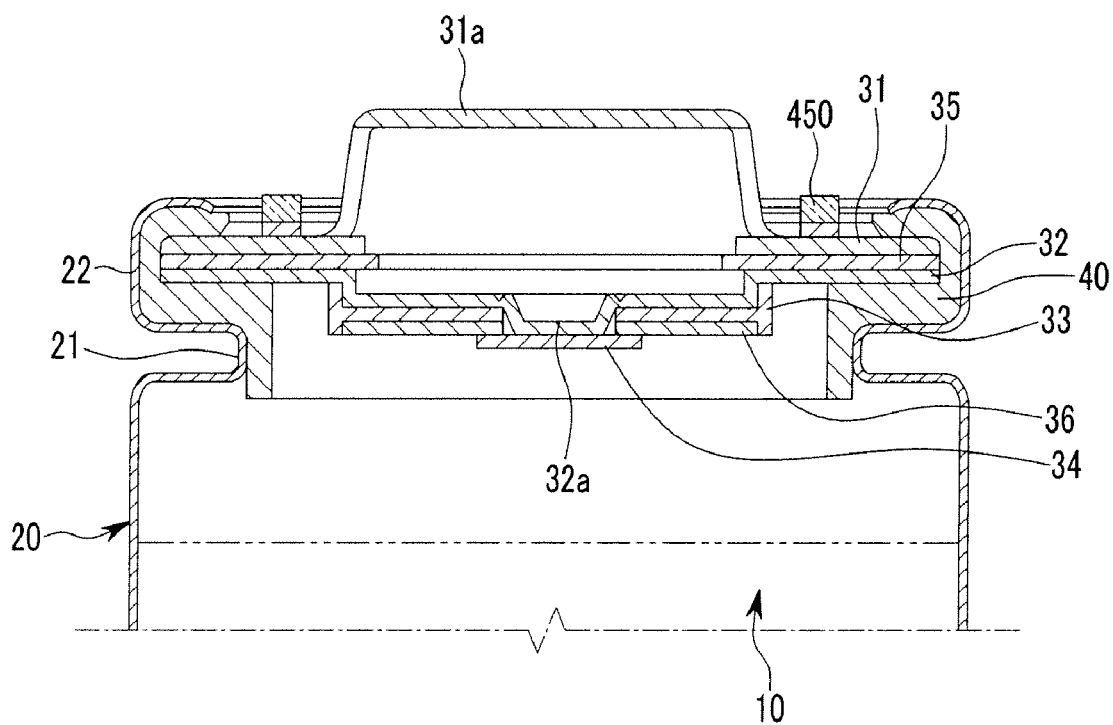
FIG. 6 is a partial cross-sectional view of a rechargeable battery according to a fourth embodiment of the present invention.

FIG. 6 is a partial cross-sectional view of a rechargeable battery according to the fourth embodiment of the present invention.

Referring to FIG. 6, a magnet 450 according to the fourth embodiment is disposed at a horizontal plane that is generally parallel to, but does not intersect the connection. For example, the magnet 450 according to the fourth embodiment may be disposed on the cap assembly 30, and more specifically, at an outer ring or periphery of the cap assembly 30 on the cap plate 31.

Since the magnet 450 of the fourth embodiment is disposed at a horizontal plane that does not intersect the connection 45, the magnet 450 forms a magnetic field around the connection 45 that may not be as strong as the magnetic field formed around the connection 45 by the magnet 50.

Figure 7:
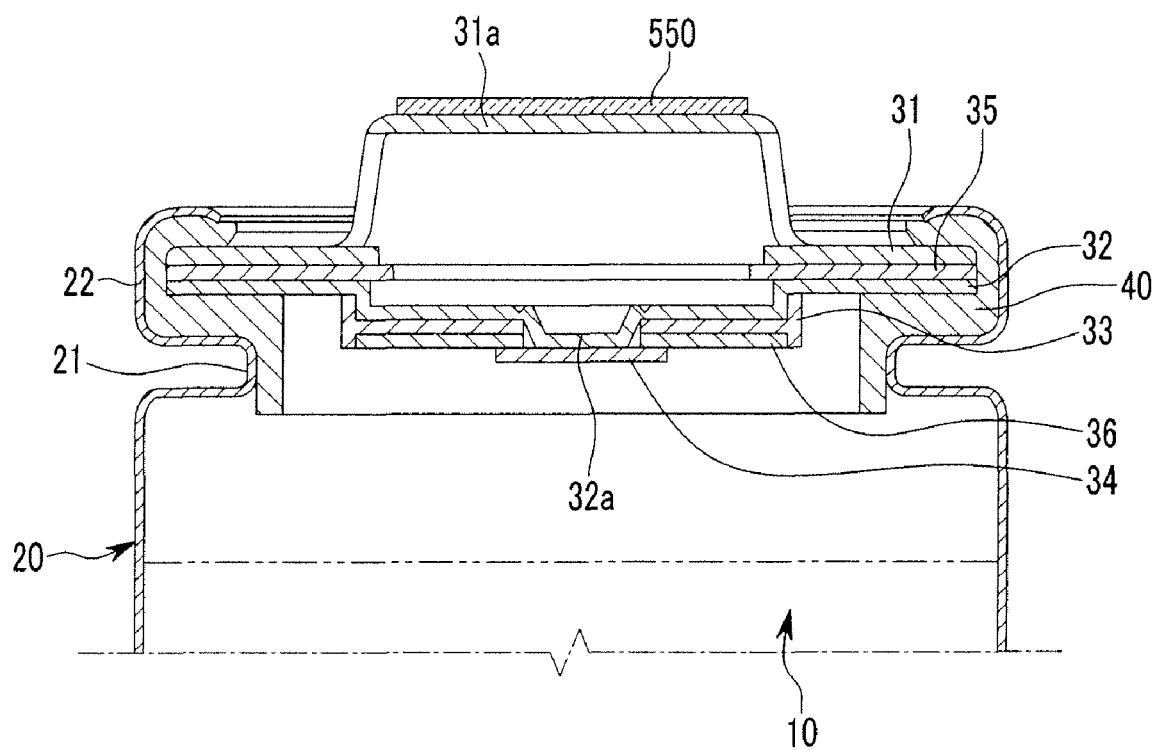
FIG. 7 is a partial cross-sectional view of a rechargeable battery according to a fifth embodiment of the present invention.

FIG. 7 is a partial cross-sectional view of a rechargeable battery according to the fifth embodiment of the present invention.

Referring to FIG. 7, a magnet 550 according to the fifth embodiment is disposed at the center of the cap assembly 30. For example, the magnet 550 according to the fifth embodiment is disposed generally at the center of the cap plate 31. In this case, the magnet 550 is formed as a conductor for allowing current flow through the cap assembly 30.

Since the magnet 550 according to the fifth embodiment is disposed at the center of a horizontal plane that does not intersect the connection 45, the magnet 550 forms a magnetic field around the connection 45 that may not be as strong as the magnetic field formed around the connection 45 by the magnet 50.

Table 1 shows results of simulations of the first to fifth embodiments, which are performed in different conditions. The magnetic field in the first to fifth embodiments is higher than 2500 gauss (G).

TABLE 1

| Factor | Feature | Effect of preventing arc generation according to distance | Effect of preventing arc generation according to voltage (maximum 350 V) |
|---|---|---|---|
| Arc distribution | First embodiment | Good | Good |
| | Second embodiment | Good | Average |
| | Third embodiment | Good | Average |
| | Fourth embodiment | Good | Average |
| | Fifth embodiment | Good | No effect |
| Gap between vent plate and sub-plate | No insulating plate included | No effect | No effect |
| | Insulating plate (PBT) included | Average | No effect |
| | Insulating plate (PI) included | Average | No effect |
| Etc. | Anodizing of vent plate and sub-plate | Average | No effect |

Table 1 clearly shows that arc generation is effectively prevented when the magnets 50, 250, 350, 450 and 550 form a magnetic field around the connection 45 to the first through fifth embodiments.

Also, Table 2 is a simulation result clearly showing that a generated arc can be eliminated using a magnet.

TABLE 2

| Voltage (V) | Amperage (A) | gap (mm) | Insulating plate | Arc elimination | Re connected | Ignition |
|---|---|---|---|---|---|---|
| 140 | 14 | 1 | Included | Good | No | No |
| 260 | 26 | 1 | Included | Good | No | No |
| 360 | 35 | 1 | Included | Good | No | No |

When an arc is generated at a gap having an insulating plate with changed amperage and voltage, the arc can be eliminated if a magnetic field is formed using a magnet. That is, the arc can be effectively eliminated by forming the magnetic field using the magnet. Also, peripheral structures around the arc generation are not melted or reconnected, and combustion does not occur around the generated arc.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:
1. A rechargeable battery comprising:
an electrode array;
a case housing the electrode array;
a cap assembly electrically connected to the electrode array through the case;
a current interruption device having a connection to electrically connect the electrode array and the cap assembly, wherein the current interruption device comprises a vent plate having a vent and a sub-plate electrically coupled to the vent plate; and
a magnet proximate the connection of the current interruption device and forming a magnetic field at the connection.

2. The rechargeable battery of claim 1, wherein the case is cylindrical and the magnet is symmetrical about a center line that extends along a length of the cylindrical case.

3. The rechargeable battery of claim 2, wherein the magnet has a circular shape or a disk shape.

4. The rechargeable battery of claim 2, wherein the magnet and the connection are located on a first plane.

5. The rechargeable battery of claim 4, wherein the magnet is circular and wherein the connection is located in a central area of the magnet.

6. The rechargeable battery of claim 4, wherein the magnet is within the case.

7. The rechargeable battery of claim 4, wherein the magnet is within the cap assembly.

8. The rechargeable battery of claim 2, wherein the magnet is outside of the case.

9. The rechargeable battery of claim 1, wherein the magnet extends along a horizontal plane that is generally parallel to a horizontal plate of the connection.

10. The rechargeable battery of claim 9, wherein the magnet is on the cap assembly.

11. The rechargeable battery of claim 10, wherein the magnet encircles a periphery of the cap assembly.

12. The rechargeable battery of claim 10, wherein the magnet is at a center of the cap assembly.

* * * * *